United States Patent
Chin et al.

(10) Patent No.: US 8,942,702 B2
(45) Date of Patent: Jan. 27, 2015

(54) INTER-RADIO ACCESS TECHNOLOGY (IRAT) HANDOVER

(71) Applicant: QUALCOMM Incorporated, San Diego, CA (US)

(72) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/686,698

(22) Filed: Nov. 27, 2012

(65) Prior Publication Data

US 2014/0148163 A1 May 29, 2014

(51) Int. Cl.
*H04W 36/14* (2009.01)

(52) U.S. Cl.
CPC ..................... *H04W 36/14* (2013.01)
USPC ........... 455/436; 455/437; 455/438; 455/420; 455/432.2; 455/435.2; 370/331; 370/329; 370/328

(58) Field of Classification Search
CPC .................................................... H04W 36/14
USPC ........... 455/432.1–453, 422.1, 458, 502, 513, 455/525, 115.3, 464, 421, 521, 522, 404.2; 370/328–329, 338
See application file for complete search history.

(56) References Cited

U.S. PATENT DOCUMENTS

| | | | | |
|---|---|---|---|---|
| 2005/0260992 A1* | 11/2005 | Moon et al. | ................... | 455/436 |
| 2006/0030309 A1* | 2/2006 | Lee et al. | ................... | 455/422.1 |
| 2009/0017826 A1* | 1/2009 | Shaheen | ........................ | 455/442 |
| 2010/0273490 A1* | 10/2010 | Velde et al. | ................... | 455/436 |
| 2011/0280141 A1* | 11/2011 | Chin et al. | ................... | 370/252 |
| 2012/0020331 A1* | 1/2012 | Chin et al. | ................... | 370/335 |
| 2012/0163248 A1* | 6/2012 | Chin et al. | ................... | 370/280 |

FOREIGN PATENT DOCUMENTS

| | | |
|---|---|---|
| WO | 2011087518 A1 | 7/2011 |
| WO | 2011090496 A1 | 7/2011 |
| WO | WO 2011087518 A1 * | 7/2011 |
| WO | WO 2011090496 A1 * | 7/2011 |

OTHER PUBLICATIONS

International Search Report and Written Opinion—PCT/US2013/071260, International Search Authority—European Patent Office, Mar. 12, 2014.

* cited by examiner

*Primary Examiner* — Babar Sarwar
(74) *Attorney, Agent, or Firm* — Kristine U. Ekwueme

(57) ABSTRACT

A user equipment (UE) acquires a time of a first cell of a first RAT and receives instructions to handover from a source RAT to the first cell of a first target RAT. The handover is delayed based on the acquired timing and the UE communicates on the source RAT during the delay.

18 Claims, 10 Drawing Sheets

INTER-RADIO ACCESS TECHNOLOGY (IRAT) HANDOVER

BACKGROUND

1. Field

Aspects of the present disclosure relate generally to wireless communication systems, and more particularly, to improving base station identity confirm and reconfirm procedures.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

In one aspect, a method of wireless communication is disclosed. The method includes acquiring timing of a first cell of a first target radio access technology (RAT). Instructions are received to handover from a source RAT to the first cell of the first target RAT. The handover is delayed based on the acquired timing and the UE communicates on the source RAT during the delay.

Another aspect discloses wireless communication having a memory and at least one processor coupled to the memory. The processor(s) is configured to acquire timing of a first cell of a first target radio access technology (RAT). The processor(s) is also configured to receive instructions to handover from a source RAT to the first cell of the first target RAT. The processor(s) is further configured to delay the handover based on the acquired timing, and to communicate on the source RAT during the delay.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of acquiring timing of a first cell of a first target RAT. The program code also causes the processor(s) to receive instructions to handover from a source RAT to the first cell of the first target rat. The program code also causes the processor(s) to delay the handover based on the acquired timing, and to communicate on the source RAT during the delay.

Another aspect discloses an apparatus including means for wireless communication and includes a means for acquiring timing of a first cell of a first target RAT. The apparatus also includes means for receiving instructions to handover from a source RAT to the first cell of the first target RAT. Also included is means for delaying the handover based on the acquired timing and means for communicating on the source RAT during the delay.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
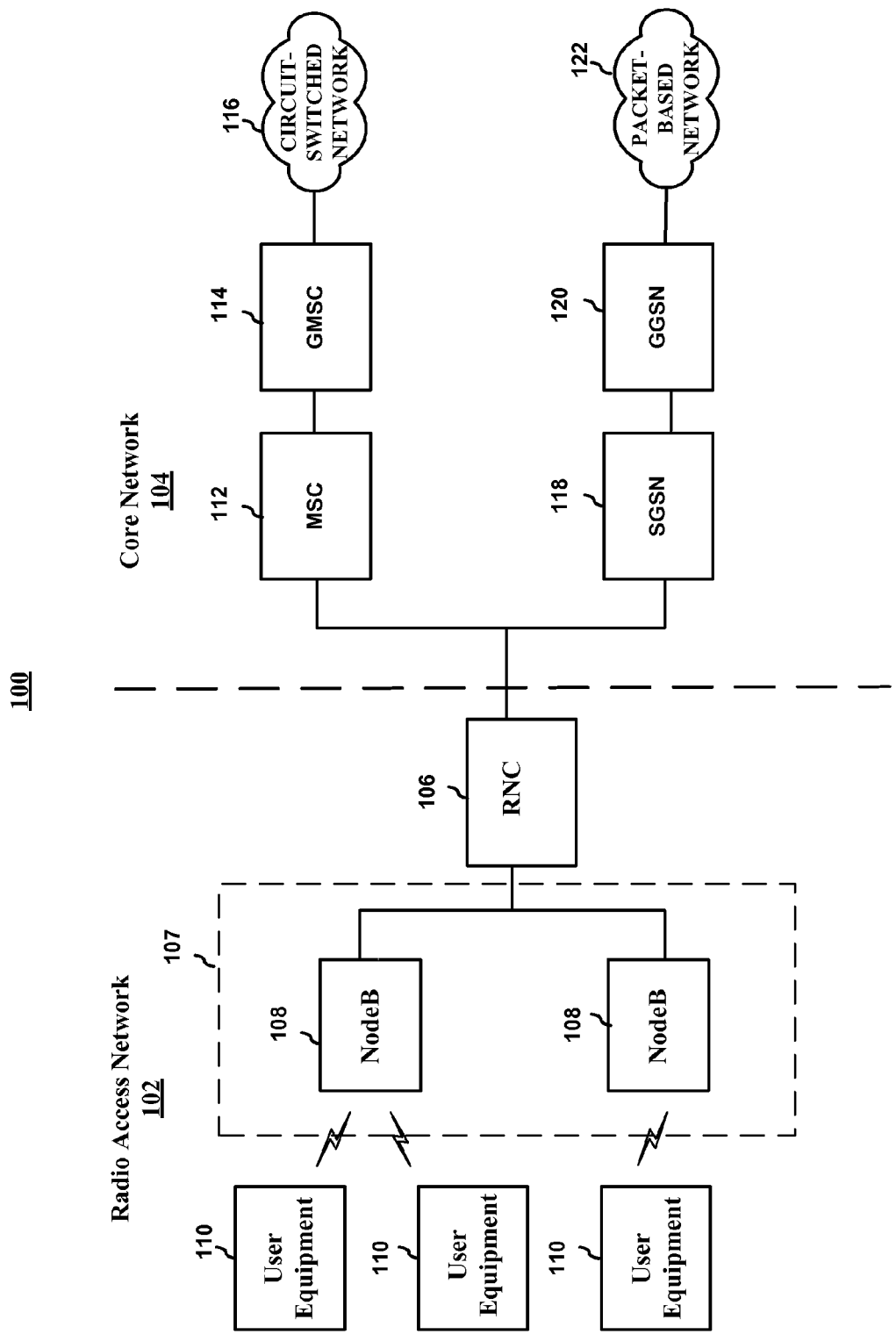
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
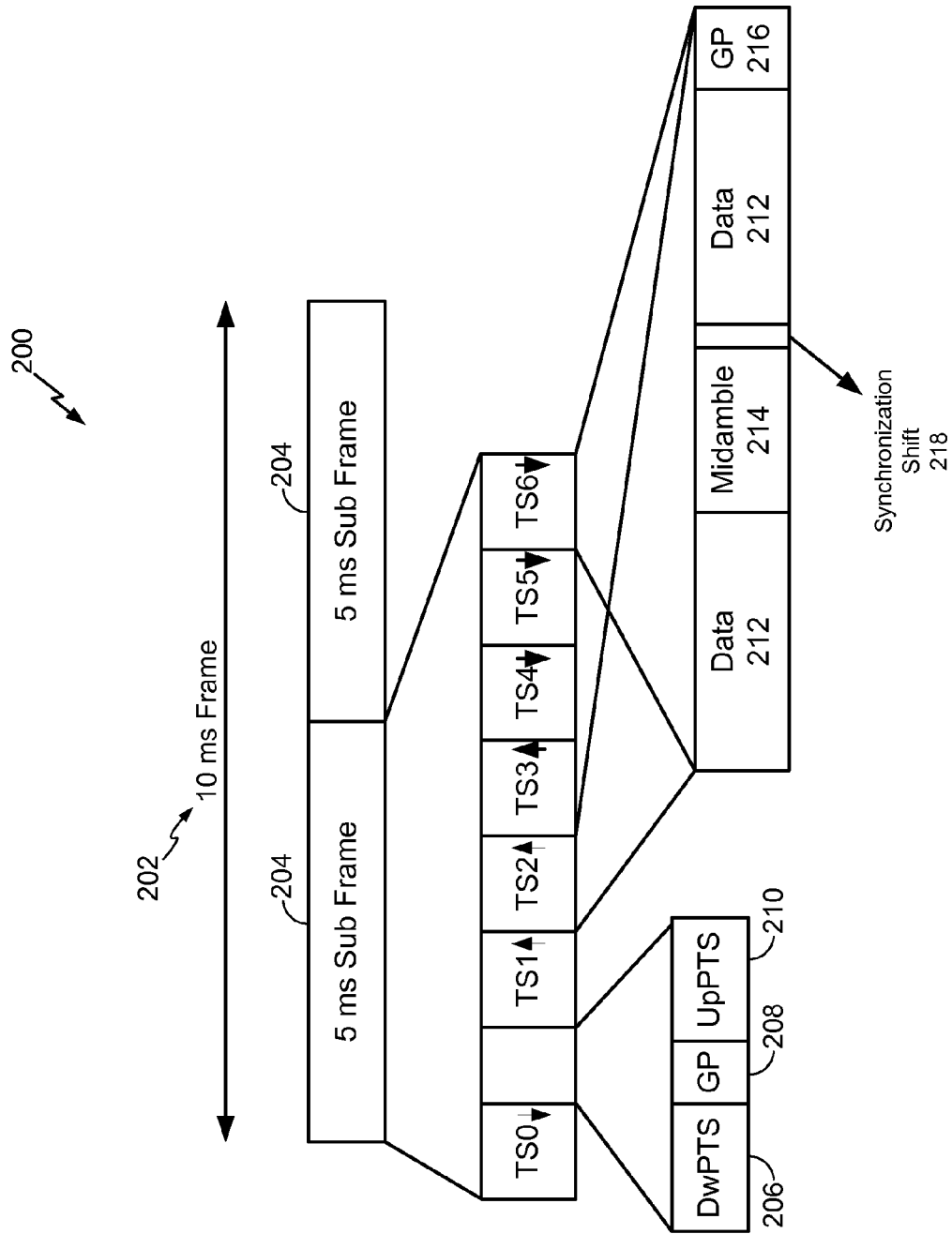
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
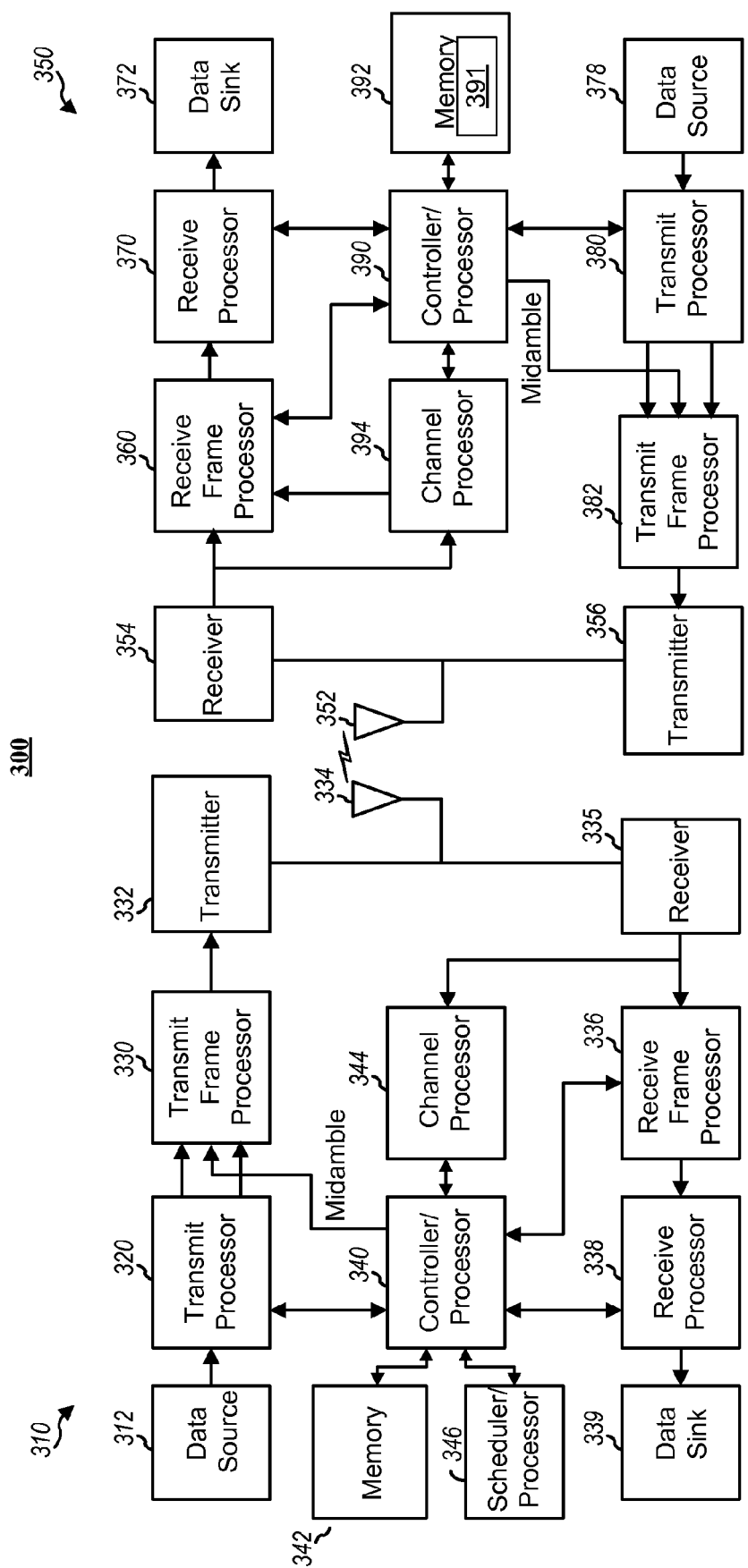
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store a timing module 391 which, when executed by the controller/processor 390, configures the UE 350 for inter-RAT/inter-frequency measurements.

Certain UEs may be capable of communicating on multiple radio access technologies (RATs). Such UEs may be referred to as multimode UEs. For example, a multimode UE may be capable of communications on a Universal Terrestrial Radio Access (UTRA) frequency division duplexed (FDD) network such as a Wideband-Code Division Multiple Access (W-CDMA) network, a UTRA time division duplexed (TDD) network such as a Time Division-Synchronous Code Division Multiple Access (TD-SCDMA) network, a Global System for Mobile Communications (GSM) network and/or a Long Term Evolution (LTE) network.

Figure 4:
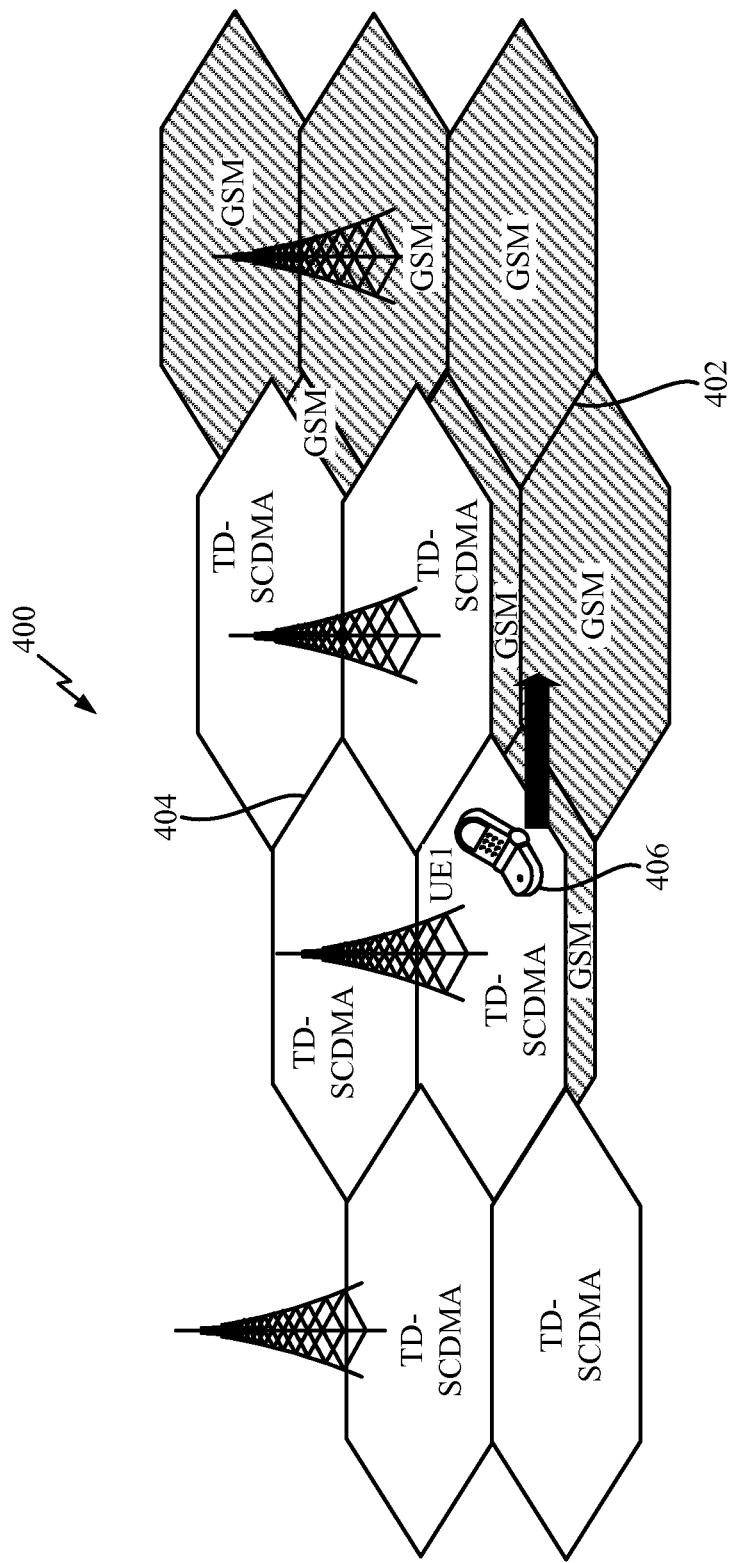
FIG. 4 illustrates network coverage areas according to aspects of the present disclosure.

Some networks, such as a newly deployed network, may cover only a portion of a geographical area. Another network, such as an older more established network, may better cover the area, including remaining portions of the geographical area. FIG. 4 illustrates coverage of a newly deployed network, such as a TD-SCDMA network and also coverage of a more established network, such as a GSM network. A geographical area 400 may include GSM cells 402 and TD-SCDMA cells 404. A user equipment (UE) 406 may move from one cell, such as a TD-SCDMA cell 404, to another cell, such as a GSM cell 402. The movement of the UE 406 may specify a handover or a cell reselection.

The handover or cell reselection may be performed when the UE moves from a coverage area of a TD-SCDMA cell to the coverage area of a GSM cell, or vice versa. A handover or cell reselection may also be performed when there is a coverage hole or lack of coverage in the TD-SCDMA network or when there is traffic balancing between the TD-SCDMA and GSM networks. As part of that handover or cell reselection process, while in a connected mode with a first system (e.g., TD-SCDMA) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter radio access technology (IRAT) measurement.

The UE may send a serving cell a measurement report indicating results of the IRAT measurement performed by the UE. The serving cell may then trigger a handover of the UE to a new cell in the other RAT based on the measurement report. The triggering may be based on a comparison between measurements of the different RATs. The measurement may include a TD-SCDMA serving cell signal strength, such as a received signal code power (RSCP) for a pilot channel (e.g., primary common control physical channel (P-CCPCH)). The signal strength is compared to a serving system threshold. The serving system threshold can be indicated to the UE through dedicated radio resource control (RRC) signaling from the network. The measurement may also include a GSM neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Handover of a UE from a serving RAT to a neighbor RAT may occur when the serving cell signal strength is below the serving system threshold. If a target GSM neighbor cell RSSI is above a neighbor system threshold, and the target GSM neighbor cell is identified and reconfirmed by the network, the UE sends a measurement report to a serving cell which commences handover.

Figure 5:
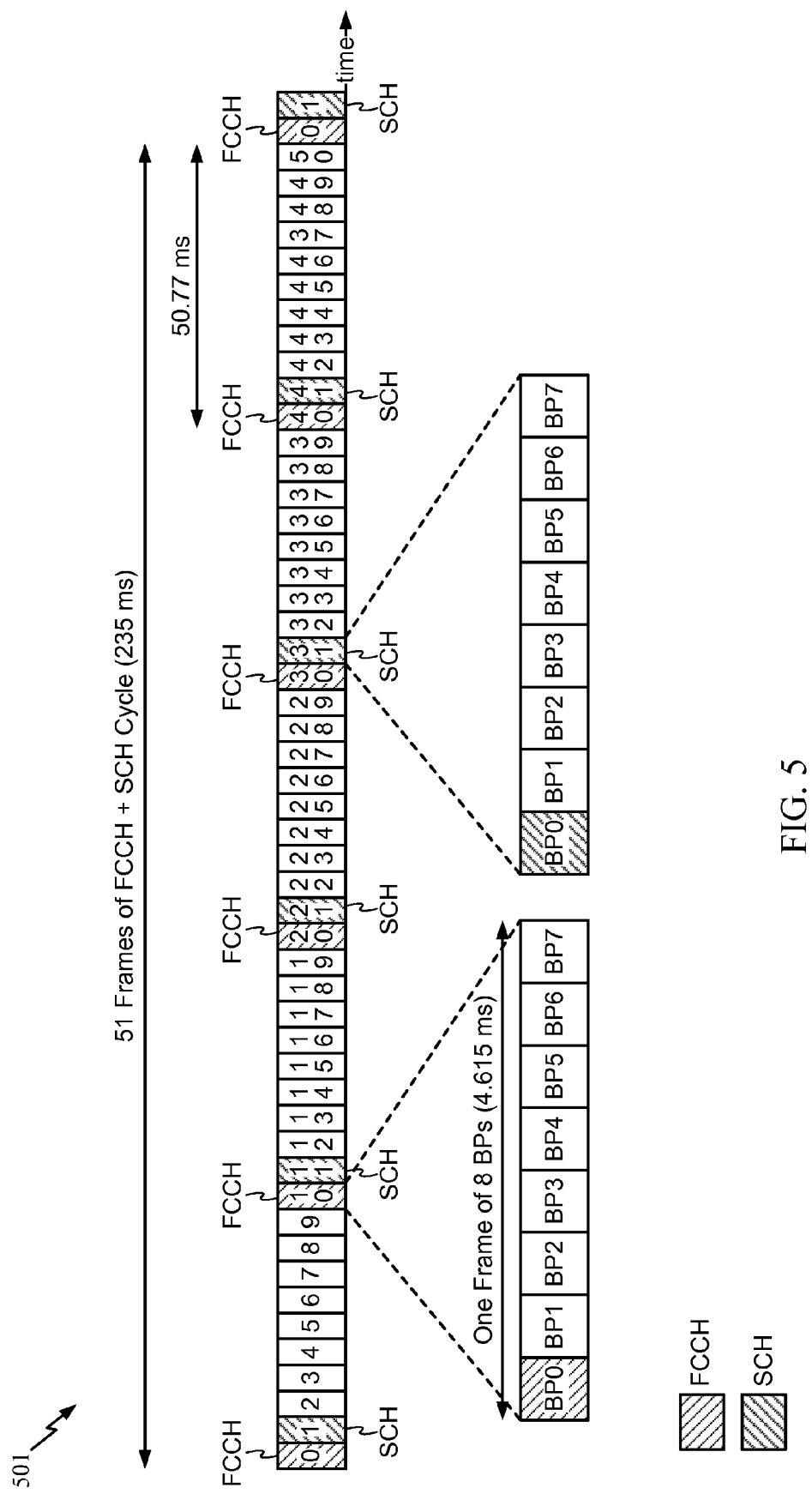
FIG. 5 is a block diagram illustrating an example GSM frame structure.

FIG. 5 illustrates a GSM frame structure 501 where each frame has eight burst periods (BPs). The frame structure includes a fifty-one frame cycle with a repetitions of the frequency correction channel (FCCH) and the synchronization channel (SCH). The FCCH is the pilot of the 200 KHz frequency channel. Additionally, the SCH can carry the base station identity code (BSIC) information. The FCCH is transmitted in the burst period zero (BP 0) of frames 0, 10, 20, 30, and 40. The SCH is transmitted in the BP 0 of frames 1, 11, 21, 31, and 41 of the 51-frame cycle. One burst period is 15/26 ms and one frame is of 120/26 ms. Therefore, one 51-frame cycle is 235 ms. The duration of each interval of 10 or 11 frames may be 46.15 or 50.77 ms, respectively. To enable IRAT measurement, the UE acquires the FCCH and the SCH.

Figure 6:
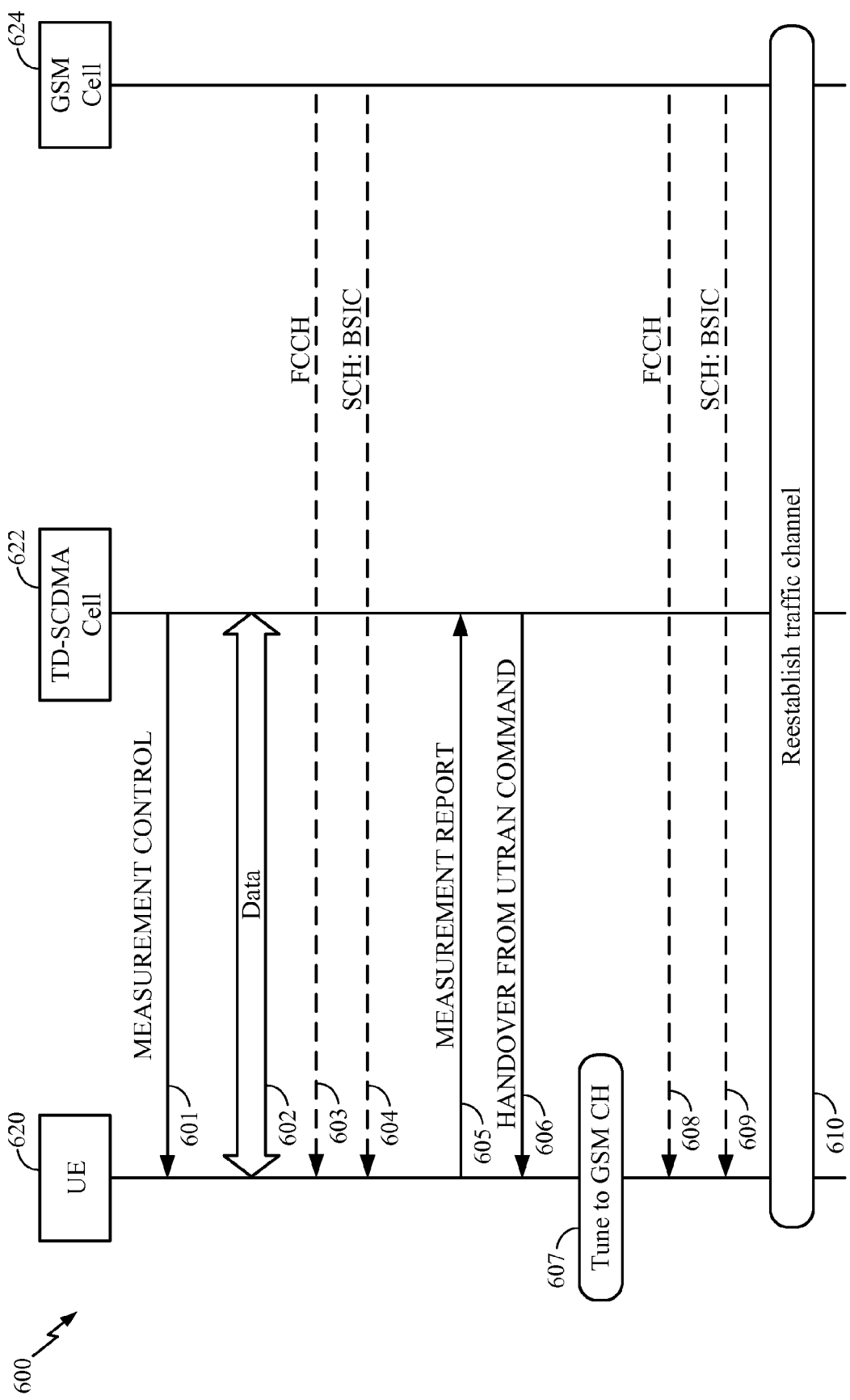
FIGS. 6-8 are call flow diagram illustrating inter-RAT handover.

FIG. 6 is a call flow diagram 600 illustrating conventional handover from TD-SCDMA to GSM. At time 601, the UE 620 receives a measurement control message from the TD-SCDMA Node B 622 (i.e., base station). The measurement control message directs the UE 620 to measure GSM cells, such as the GSM cell 624. At time 602, data continues to be transmitted between the UE 620 and the Node B 622. At times 603, 604, the UE 620 measures the GSM cell 624 by acquiring the FCCH and the base station identity code (BSIC) of the SCH of the GSM cell 624. The UE 620 reports to the Node B 622 with the MEASUREMENT REPORT message at time 605. After the UTRAN and GERAN complete the resource preparation, the Node B 622 commands the UE 620 to perform an inter-RAT measurement from UTRAN to GERAN via a HANDOVER FROM UTRAN COMMAND, at time 606. Next, at time 607, the UE 620 tunes to the GSM channel. At times 608, 609, the UE 620 acquires the FCCH and verifies the BSIC in the SCH as directed by the received handover message. Next, at time 610, the UE 620 reestablishes the traffic channel with the GSM cell 624.

The length of time for the acquisition of FCCH and SCH, in the above described handover procedure may be ~50 ms (i.e., 11 frames of the FCCH period). This length of time may become an unacceptable overhead in the IRAT handover procedure. One aspect of the present disclosure is directed to improving the IRAT handover procedure and reducing the overhead.

In one aspect, the TD-SCDMA UE caches or reproduces the timing of the FCCH and SCH in addition to the frequency channel and BSIC of the GSM cells the UE previously measured. The UE stores the timing of a 51 frame cycle when the cycle begins. The cycle repeats at a period of 235 ms. Because the UE is aware of the 51 frame cycle boundary, the UE can predict when the FCCH and SCH will be transmitted, by using the 10 or 11 frame periods to determine the next FCCH and SCH transmission time.

In one aspect, the timing for the GSM cell to transmit FCCH and SCH is used to improve performance during handover. However, when the UE is performing measurements, the UE may not know which cell will become the handover target GSM cell. Therefore, the UE may store the timing information of the FCCH and SCH of all cells measured, to assist in the handover. Alternatively, the UE may store the strongest cell or N (e.g., 3-5) strongest cells in order to reduce the amount of data being stored.

Figure 7:
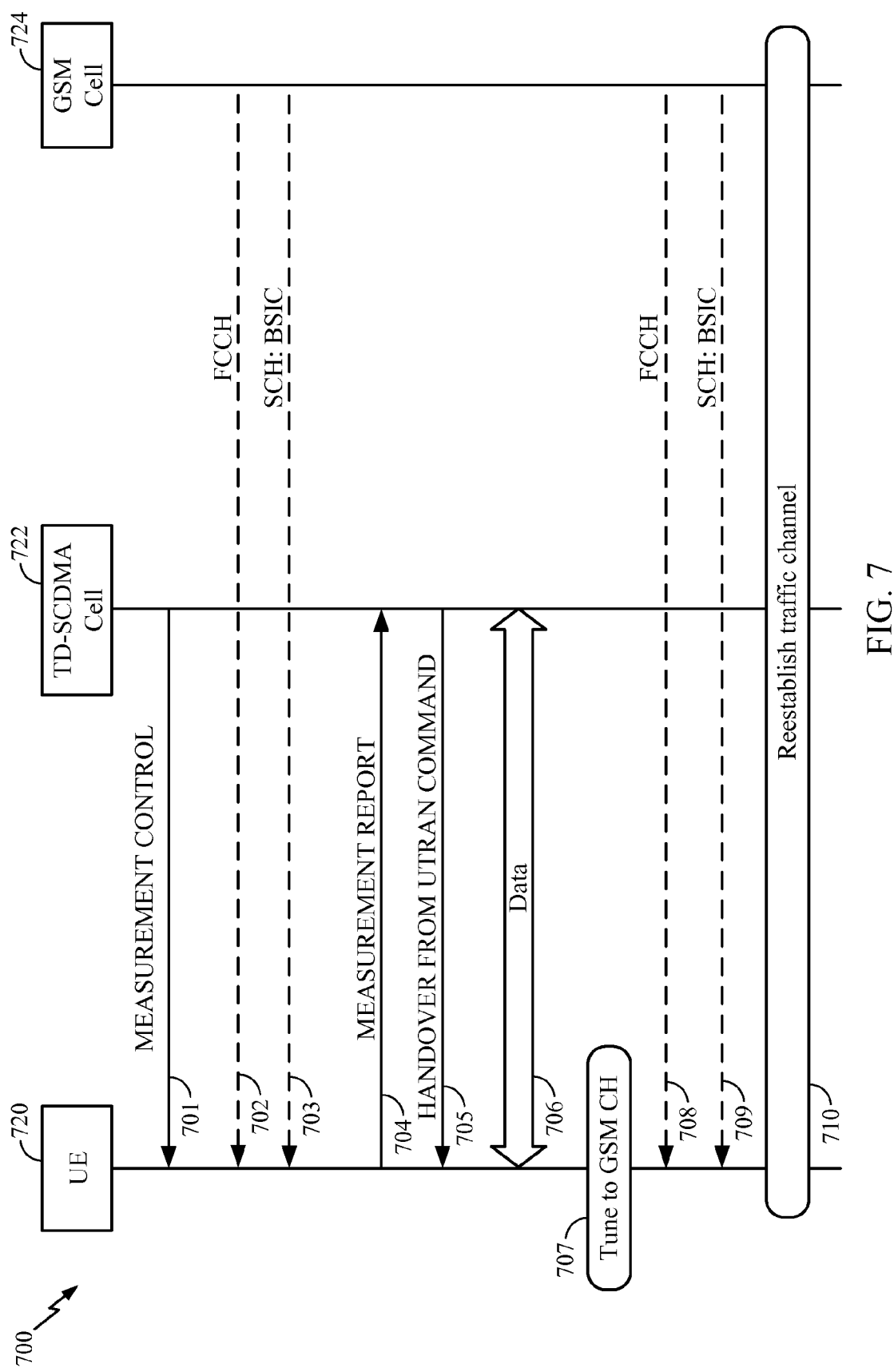

FIG. 7 is a call flow diagram 700 illustrating handover from TD-SCDMA to GSM, in which the timing information is locally cached at the UE 720. At time 701, the UE 720 receives a measurement control message from the TD-SCDMA Node B 722. The measurement control message directs the UE 720 to measure GSM cells, such as the GSM cell 724. At times 702, 703, the UE 720 acquires the FCCH and SCH of the GSM cell 724. The UE 720 reports to the Node B 722 with the MEASUREMENT REPORT message at time 704.

When the UE 720 receives the handover command from the Node B 722, at time 705, the UE 720 checks the locally cached timing of the corresponding target GSM cell 724 to predict when the FCCH and SCH will be transmitted. While waiting for that time to occur, the UE can continue communicating with the Node B at time 706. Once the predicted time arrives, at time 707, the UE 720 tunes to the GSM channel. At times 708, 709, the UE 720 acquires the FCCH and verifies the BSIC in the SCH as directed by the received handover message. Next, at time 710, the UE 720 reestablishes the traffic channel with the GSM cell 724, at time 710. Thus, according to this aspect, the UE is able to extend its data communication instead of unnecessarily waiting for the FCCH and SCH on the GSM network.

In an alternative aspect, a UE can measure and acquire other cells in a GSM network prior to the target cell transmitting FCCH and SCH, instead of continuing data communications. For example, referring to FIG. 8, the UE 820 can measure and acquire the neighbor cells 826 while awaiting the upcoming FCCH and SCH of the GSM cell 824. Based on these measurements, the UE 820 can update the latest neighbor cell information and signal level. Therefore if the handover fails, the UE 820 can quickly camp on other cell using updated neighbor information without measuring again. Although the neighbor cell and target cell are described as GSM cells, other RATs (e.g., TD-SCDMA and LTE) are also contemplated.

Figure 8:
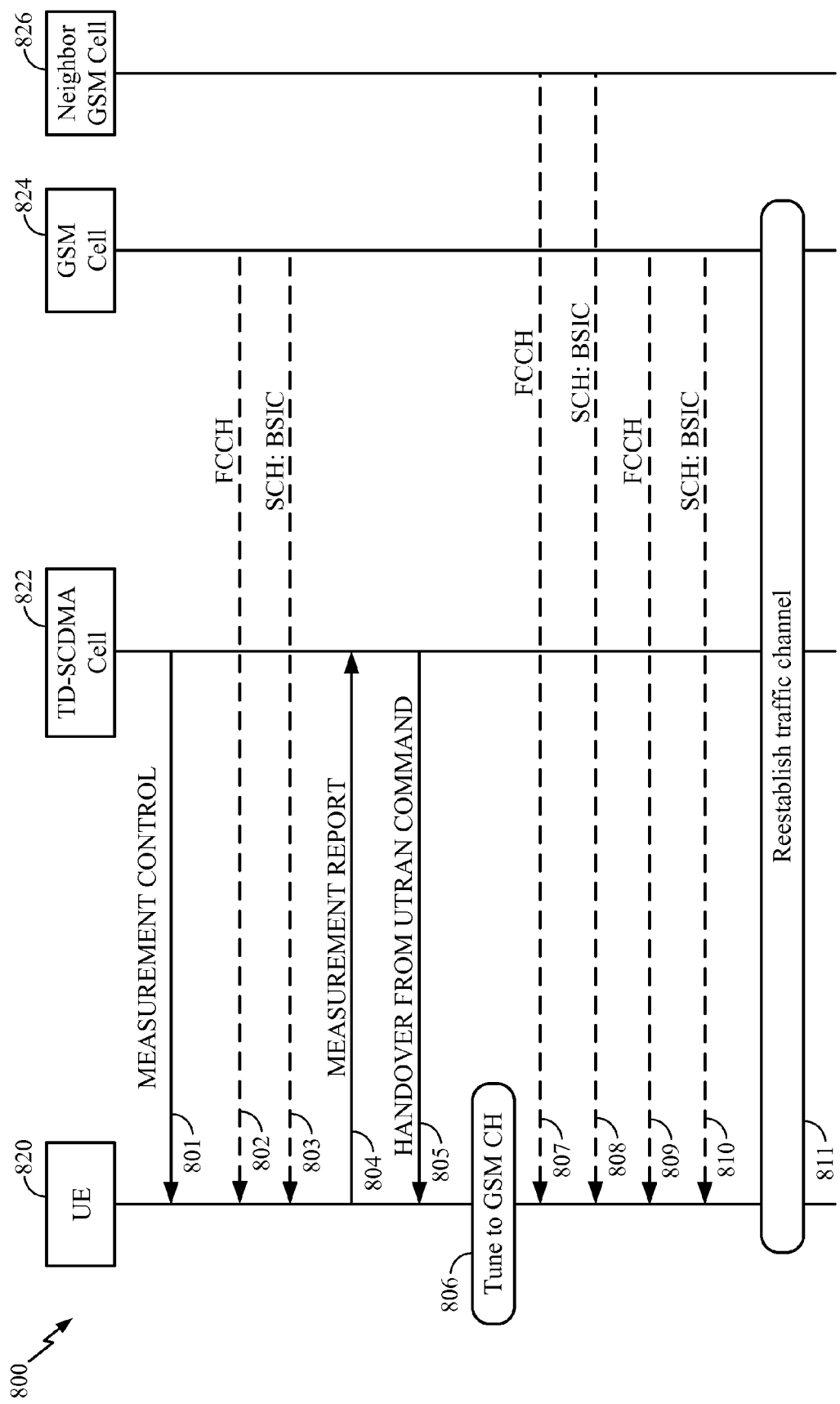

FIG. 8 is a call flow diagram 800 illustrating handover from TD-SCDMA to GSM, in which the UE 820 can measure and acquire additional neighbor cells while awaiting the FCCH and SCH of the target cell. At time 801, the UE 820 receives a measurement control message from the TD-SCDMA Node B 822. The measurement control message directs the UE 820 to measure GSM cells, such as the GSM cell 824. At times 802, 803, the UE 820 acquires the FCCH and SCH of the GSM cell 824. The UE 820 reports to the Node B 822 with the MEASUREMENT REPORT message at time 804.

When the UE 820 receives the handover command from the Node B 822, at time 805, the UE 820 can check the locally cached timing of the corresponding target GSM cell 824 to predict when the FCCH and SCH will be transmitted. While awaiting the upcoming FCCH and SCH, the UE 820 can tune to the neighbor GSM cell 826 at time 806. At time 807, the UE 820 acquires the FCCH of the neighbor GSM cell 826. At time 808, the UE verifies BSIC in the SCH of the neighbor GSM cell 826 and measures the received signal strength. When the FCCH and SCH of the target cell 824 are transmitted, at times 809, 810, the UE 820 acquires the FCCH and verifies the BSIC in the SCH of the GSM cell 824. A time 811, the UE 820 reestablishes the traffic channel with the GSM cell 824. In the event the handover fails, the UE can begin a handover to the neighbor cell 826 based on the recent measurements.

In another aspect, the UE can power down or turn off hardware components to reduce power consumption. In particular, during the time interval between the UE receiving a handover command and the target GSM cell broadcasting FCCH, the UE can shut down some hardware components, such as, radio frequency components and/or transmission components. Powering down, instead of continuing data communications or measuring neighbor cells will save UE battery power.

The benefits of the above procedures include reducing the wait time for the UE to measure the target cell, extending the transmission time, and reducing service disruption time. Configuring the UE to measure other neighbor cells enables the UE to recover from handover failure more quickly and/or to reduce power consumption.

Figure 9:
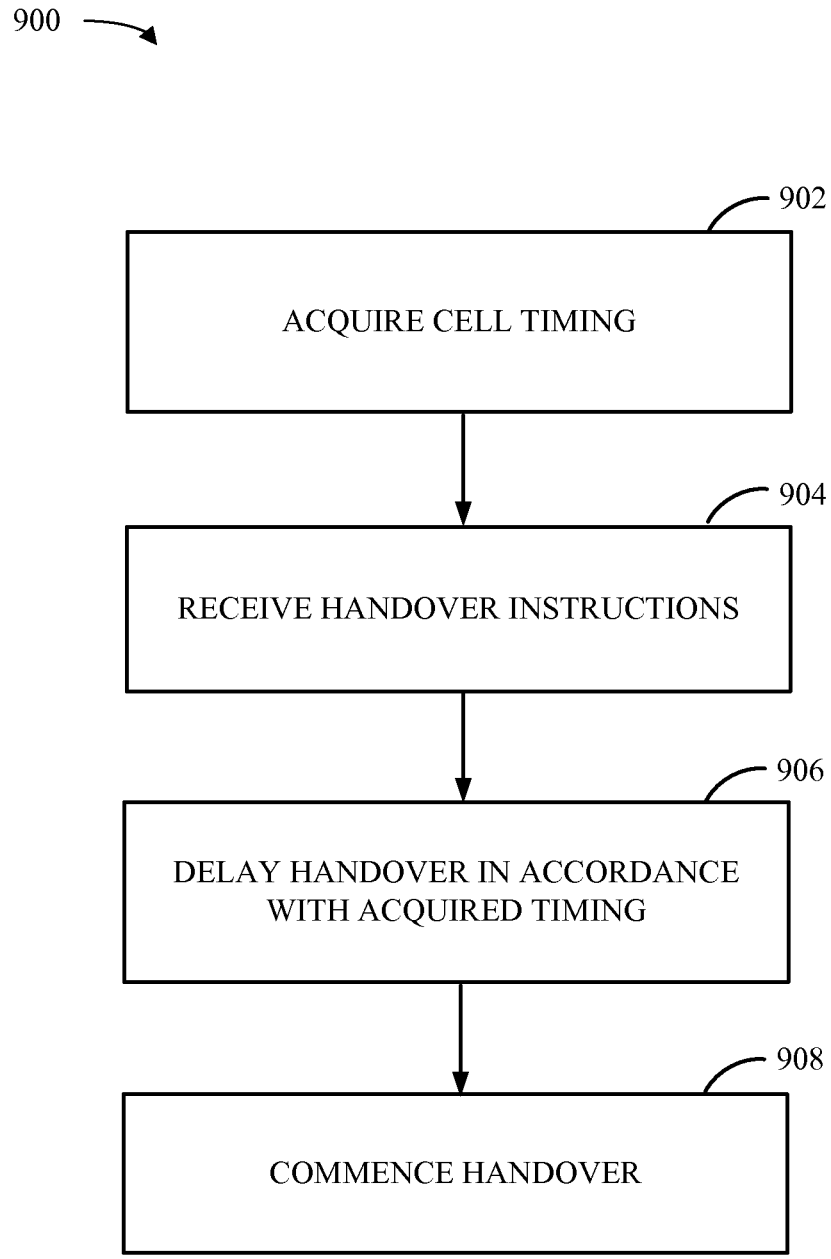
FIG. 9 is a flow diagram illustrating an exemplary process for IRAT handover according to an aspect to the present disclosure.

FIG. 9 shows a wireless communication method 900 according to one aspect of the disclosure. A UE 350 acquires timing of a first cell of a first target radio access technology (RAT) at block 902. The timing information can be locally cached. At block 904 the UE 350 receives instructions to handover from a source RAT to the first target RAT. At block 906, the UE delays the handover based on the stored timing information. During the delay, the UE could continue data communications, power down some components, or measure neighbor cells, for example. At block 908, the UE 350 commence handover procedures in accordance with the stored timing information.

Figure 10:
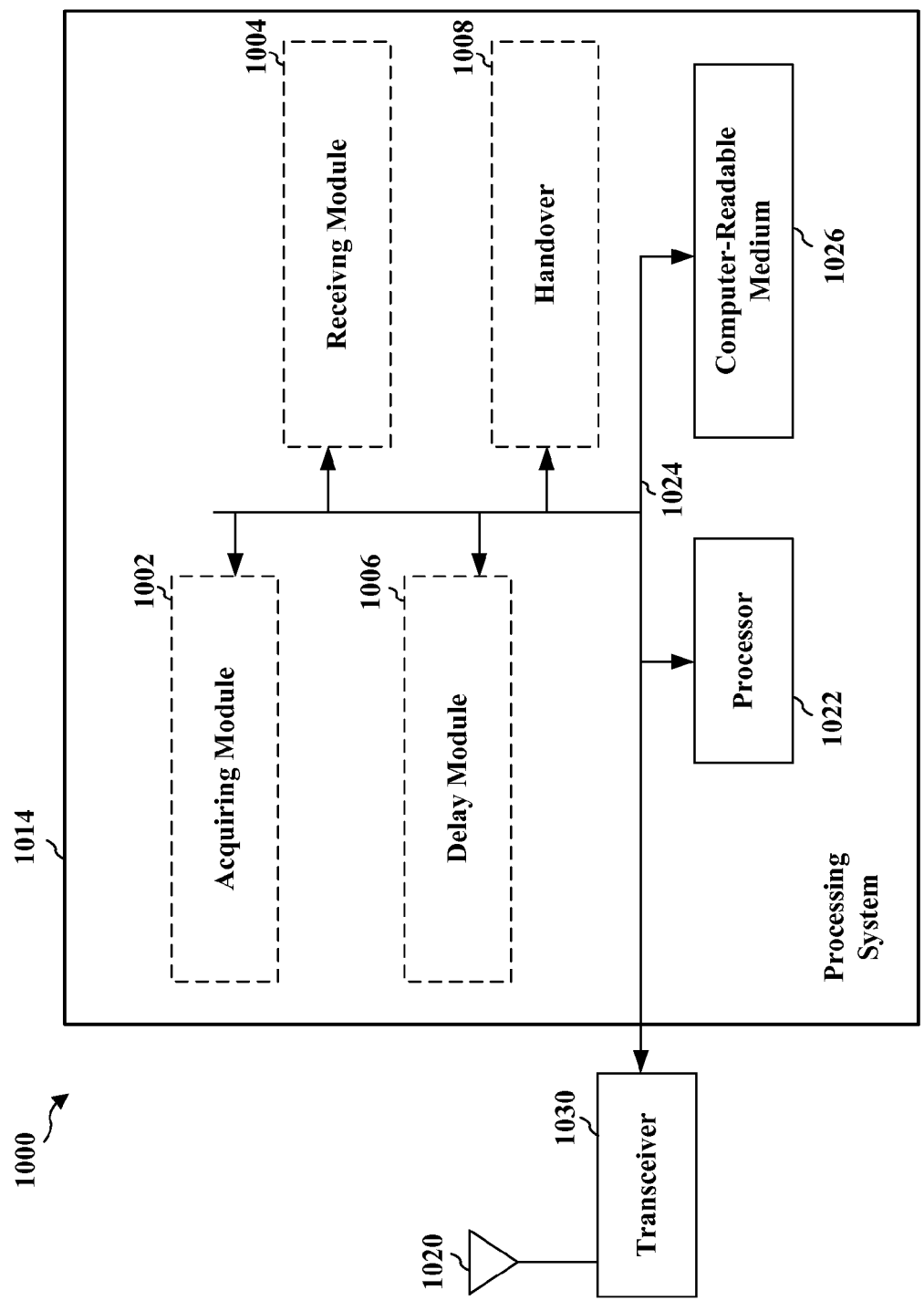
FIG. 10 is a block diagram illustrating an example of a hardware implementation for an apparatus employing a processing system according to one aspect of the present disclosure.

FIG. 10 is a diagram illustrating an example of a hardware implementation for an apparatus 600 employing an improved handover system 1014. The improved handover system 1014 may be implemented with a bus architecture, represented generally by the bus 1024. The bus 1024 may include any number of interconnecting buses and bridges depending on the specific application of the improved handover system 1014 and the overall design constraints. The bus 1024 links together various circuits including one or more processors and/or hardware modules, represented by the processor 1022 the modules 1002, 1004, 1006, 1008 and the computer-readable medium 1026. The bus 1024 may also link various other circuits such as timing sources, peripherals, voltage regulators, and power management circuits, which are well known in the art, and therefore, will not be described any further.

The apparatus includes an improved handover system 1014 coupled to a transceiver 1030. The transceiver 1030 is coupled to one or more antennas 1020. The transceiver 1030 enables communicating with various other apparatus over a transmission medium. The improved handover system 1014 includes a processor 1022 coupled to a computer-readable medium 1026. The processor 1022 is responsible for general processing, including the execution of software stored on the computer-readable medium 1026. The software, when executed by the processor 1022, causes the improved handover system 1014 to perform the various functions described for any particular apparatus. The computer-readable medium 1026 may also be used for storing data that is manipulated by the processor 1022 when executing software.

The improved handover system 1014 includes an acquiring module 1002 for acquiring timing of a first cell of a first target radio access technology (RAT). The timing information can be locally stored. The improved handover system 1014 includes a receiving module 1004 that receives instructions to handover from a source RAT to the first target RAT. The improved handover system 1014 includes a delay module 1006 that delays the handover based on the stored timing information. During the delay, the UE could continue data communications, power down some components, or measure neighbor cells, for example. The improved handover system 1014 further includes a handover module 908 for commence handover procedures in accordance with the stored timing information. The modules may be software modules running in the processor 1022, resident/stored in the computer-readable medium 1026, one or more hardware modules coupled to the processor 1022, or some combination thereof. The improved handover system 1014 includes system 1014 may be a component of the UE 350 and may include the memory 392, and/or the controller/processor 390.

In one configuration, an apparatus, such as a UE, is configured for wireless communication including means for acquiring, means for receiving, means for delaying, and means for handing over. In one aspect, the acquiring means, the handover means, and the receiving means may be the antennas 352, the receiver 354, the transmitter 356, the controller/processor 390, the memory 392, the improved handover system 1014, the acquiring module 1002, receiving module 1004, and/or the handover module 1008 configured to perform the functions recited by the aforementioned means. In one aspect the delay module may be the controller/processor 390, the memory 392, the improved handover system 1014, the timing module 391, and/or the delay module 1006. In another aspect, the aforementioned means may be a module or any apparatus configured to perform the functions recited by the aforementioned means.

Several aspects of a telecommunications system has been presented with reference to TD-SCDMA and GSM systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   storing timing of a first cell of a first target radio access technology (RAT);
   receiving instructions to handover from a source RAT to the first cell of the first target RAT after storing the timing of the first cell of the first RAT;
   delaying the handover based on the stored timing for a delay period; and
   communicating on the source RAT during the delay period.

2. The method of claim 1, further comprising measuring additional cells during the delay period.

3. The method of claim 2, further comprising handing over to one of the additional cells when the handover to the first cell fails.

4. The method of claim 2, in which the additional cells are in a second target RAT, the first target RAT and/or the source RAT.

5. The method of claim 1, further comprising powering down at least one component during the delay period.

6. The method of claim 1, further comprising storing timing of additional cells.

7. The method of claim 6, in which the additional cells are selected based on signal strength.

8. An apparatus for wireless communication, comprising:
   a memory; and
   at least one processor coupled to the memory, the at least one processor being configured:
   to store timing of a first cell of a first target radio access technology (RAT);
   to receive instructions to handover from a source RAT to the first cell of the first target RAT after storing the timing of the first cell of the first RAT;
   to delay the handover based on the stored timing for a delay period; and
   to communicate on the source RAT during the delay period.

9. The apparatus of claim 8, in which the processor is further configured to measure additional cells during the delay period.

10. The apparatus of claim 9, in which the processor is further configured to hand over to one of the additional cells when the handover to the first cell fails.

11. The apparatus of claim 9, in which the additional cells are in a second target RAT, the first target RAT and/or the source RAT.

12. The apparatus of claim 8, in which the processor is further configured to power down at least one component during the delay period.

13. The apparatus of claim 8, in which the processor is further configured to store timing of additional cells.

14. The apparatus of claim 13, in which the additional cells are selected based on signal strength.

15. A computer program product for wireless communication in a wireless network, comprising:
 a non-transitory computer-readable medium having non-transitory program code recorded thereon, the program code comprising:
 program code to store timing of a first cell of a first target radio access technology (RAT);
 program code to receive instructions to handover from a source RAT to the first cell of the first target RAT after storing the timing of the first cell of the first RAT;
 program code to delay the handover based on the stored timing for a delay period; and
 program code to communicate on the source RAT during the delay period.

16. The computer program product of claim 15, further comprising program code to measure additional cells during the delay period.

17. An apparatus for wireless communication, comprising:
 means for storing timing of a first cell of a first target radio access technology (RAT);
 means for receiving instructions to handover from a source RAT to the first cell of the first target RAT after storing the timing of the first cell of the first RAT;
 means for delaying the handover based on the stored timing for a delay period; and
 means for communicating on the source RAT during the delay period.

18. The apparatus of claim 17, further comprising means for measuring additional cells during the delay period.

* * * * *